United States Patent [19]
Witherspoon et al.

[11] 3,985,578
[45] Oct. 12, 1976

[54] TAILORED-CARBON SUBSTRATE FOR FUEL CELL ELECTRODES

[75] Inventors: Romeo Richard Witherspoon, Utica; Richard Leighton Adams, Ferndale, both of Mich.

[73] Assignee: General Motors Corporation, Detroit, Mich.

[22] Filed: June 27, 1975

[21] Appl. No.: 591,075

[52] U.S. Cl. .............................. 429/44; 423/447.1; 423/447.2
[51] Int. Cl.² ...................... H01M 4/86; H01M 4/88
[58] Field of Search ............. 136/121, 122, 120 AC, 136/86 D

[56] References Cited
UNITED STATES PATENTS

| | | | |
|---|---|---|---|
| 3,258,363 | 6/1966 | Lieb | 136/121 |
| 3,647,551 | 3/1972 | Reed | 136/122 |
| 3,801,374 | 4/1974 | Dews et al. | 136/121 |

*Primary Examiner*—John H. Mack
*Assistant Examiner*—H. A. Feeley
*Attorney, Agent, or Firm*—J. I. Pulley

[57] ABSTRACT

In accordance with a preferred embodiment of this invention, the polarization or overvoltage of a carbon black-based air cathode is significantly reduced by adding from 1 to 5 percent, by weight based on the total carbon composition, of carbon derived from poly(vinylidene chloride) (hereinafter PVdC) to the carbon black, prior to the formation of the electrode. To accomplish this, the porous and particulate carbon black is initially blended with a solution of PVdC; the resulting blend is dried, and then dehydrochlorinated and baked at a temperature in the range of from 900° C. to 1,100° C. The electrocatalytic layer of the cathode is then prepared from this tailored carbon substrate.

4 Claims, 8 Drawing Figures

TAILORED-CARBON SUBSTRATE FOR FUEL CELL ELECTRODES

FIELD OF THE INVENTION

This invention relates to a carbon-based substrate for electrodes used in fuel cells which operate at ambient temperatures and wherein the electrode separates a liquid electrolyte from a gaseous reactant.

BACKGROUND OF THE INVENTION

Fuel cells have the potential of providing a significant portion of our future energy needs. However, a significant obstacle to achieving that potential is an electrode polarization phenomenon which is evidenced by a gradual loss of voltage between the two poles of the fuel cell. Polarization is a characteristic of the electrode, and after a period of time it becomes necessary to replace the electrodes to regain an acceptable voltage.

OBJECTS OF THE INVENTION

It is an object of this invention to provide a polarization resistant fuel cell electrode having an electrocatalytic carbon substrate formed from intimately mixed carbon particles and poly(vinylidene chloride) char. This electrode is useful in fuel cells which operate at ambient temperature and which employ a liquid electrolyte and gaseous fuels and/or oxidants.

It is a further object of this invention to provide a method of forming a carbonaceous material which may in turn be used to form a polarization resistant air cathode. This subject method includes: 1) mixing a conventional carbon black material with a solution or an emulsion of poly(vinylidene chloride); 2) drying the resulting mixture; 3) dehydrochlorinating the blend to transform the polymer into a char; and baking the blend at a temperature within the range of from 700° C. to 1,400° C.

It is still a further object of this invention to provide an improved carbonaceous material suitable for use in fuel cell electrodes wherein the material is formed from carbon black and intimately mixed therewith from 1 to 15 percent by weight of poly(vinylidene chloride) char.

It is another object of the subject invention to provide a carbonaceous material which may be catalyzed and used to form the electrocatalytic substrate employed in fuel cells which operate at ambient temperature and which have a liquid alkaline or acid electrolyte and gaseous reactants wherein the carbonaceous material is an intimate mixture of porous carbon particles having an average particle diameter in the range of from 0.07 microns to about 130 A and having pores with a diameter of from about 30 A to 300 A and a porous polymer char having a pore diameter of from about 10 A to about 25 A. It is to be noted that internal cavities, surfaces irregularities and/or interstices between the carbon particles may constitute pores as the term is used herein.

SUMMARY OF THE INVENTION

These and other objects are accomplished in accordance with a preferred embodiment of this invention by first adding, with continuous mixing, a solution of PVdC in an organic solvent such as tetrahydrofuran to a particulate carbon black having a particle size in the range of from 130 A to 300 A. The preferred concentration of the polymer solution is from about 5 to about 15 grams of polymer per 100 milliliters of solution. This first step forms a thick paste which is then dried to remove the solvent (which can be reclaimed) and a frangible material which is then ground to a consistency of from about 10 to 20 mesh or finer. This mixture is then heated to a temperature of from about 900° C. to 1,100° C. to dehydrochlorinate the PVdC and form a porous char therefrom, and also to stabilize the carbon black; this process typically requires at least about one hour. The specified temperature is preferred because it ensures the maximum pore volume in the PVdC char. This baking step may be conducted in the presence of an inert gas flowing through the mixture.

Particulate carbon substrates used in air cathodes typically are particulate porous materials and a major portion of the pores hve an optimum diameter in the range of from about 40 to 200 A; typically a significant portion of the porosity is surface irregularities and interstices between the particles. It has been learned that pores in this particular size range are best for the electrochemical processes occurring in a fuel cell. However, the carbonaceous material produced in accordance with the above process will have, in addition to the pore size in the electrochemically active region, a significant number of pores having a diameter in the range of from about 10 A to 20 A. This two nodal pore size distribution is necessary but not sufficient for the desired results. It is also necessary that the two materials, the particulate carbon and the PVdC char, be intimately mixed by a process such as the solution deposition technique described above. The exact reason for these requirements is not known at this time because we lack a complete understanding of the transport and chemical phenomena taking place on the surfaces of fuel cell electrodes.

The proportion of pores in or on the subject tailored carbon substrate having a diameter in the range of 10 A to 20 A will of course depend on the amount of PVdC char which is added to the carbon black. In the final carbonaceous material, produced in accordance with this invention, it is preferred that the carbon from the PVdC constitutes from 1 to 5 percent by weight of the total carbonaceous material.

In the preparation of the subject tailored carbon substrate the only critical temperature is that at which the mixture is baked. A temperature in the range of from 900° C. to 1,100° C. is preferred because this temperature produces the maximum pore volume in the PVdC char; significantly higher or lower temperatures such as below 600° C. or above 1,500° C. will begin to marketedly reduce this pore volume which apparently plays a significant role in the subject polarization resistant electrode. Therefore, the effectiveness of the subject carbonaceous material will be reduced accordingly.

By the use of the subject process to tailor a particulate carbon substrate material, it is possible to reduce the voltage loss at the air cathode due to electrode polarization by as much as 30 to 50 percent at current densities in the range of from 50 to 800 milliamps per square centimeter (hereinafter $mA/cm^2$) when compared to the polarization of a carbon black material having a particle size which is the same as that used to make the tailored-carbon substrate. In addition, tailored-carbon substrates prepared in accordance with the subject process exhibit a loss in voltage due to electrode polarization which is about ¼ that of electrodes prepared from PVdC char alone. Since, the potential loss due to polarization of an air cathode prepared from the subject tailored carbon is much less than the potential loss due to polarization of an air cathode prepared from either materials individually, it is appropriate to label the combined effect as synergistic. The subject process is effective with a wide range of carbon particles having diameters ranging from 0.07 microns down to 130 A; however, the electrode having the lowest polarization when the carbon black has a particle size of less than 300 A and the carbon particles have low internal porosity.

DETAILED DESCRIPTION OF THE INVENTION

Figure 1:
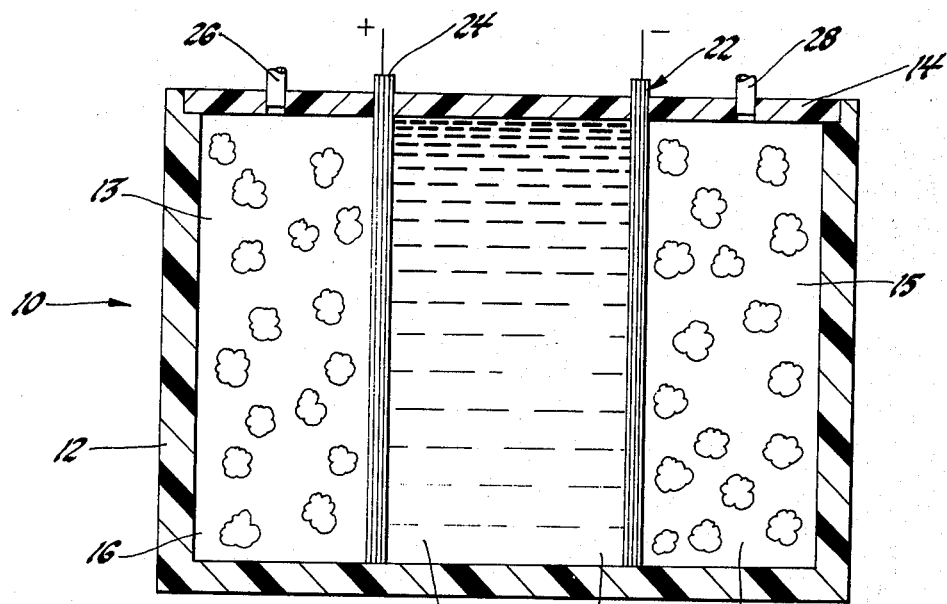

These and other advantages of the subject invention will be more easily understood in view of a detailed description thereof which will include specific examples and frequent reference to the drawings in which:

FIG. 1 is a cross sectional schematic view of a simplified fuel cell 10 having a case 12 and a cover 14. This fuel cell is divided into three chambers, the first chamber 16 holding a gaseous fuel such as hydrogen 13, the second chamber 18 holding the alkaline electrolyte 11 and the third chamber 20 holding a gaseous oxidant 15 such as oxygen or air. Inlet ports 26 and 28 provide means for supplying the gaseous fuel and oxidant. Electrode 24 which is normally referred to as a hydrogen anode separates the first chamber from the second chamber. The cathode 22 which separates the second chamber from the third chamber is commonly referred to as an air cathode.

Figure 2:
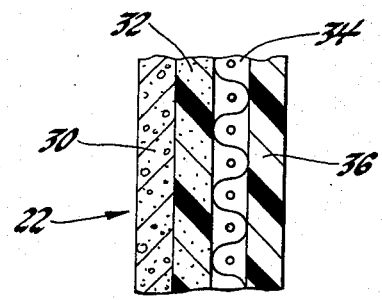

FIG. 2 is a cross sectional view of an air cathode operable in the fuel cell schematically depicted in FIG. 1 showing a hydrophilic layer 30 which is disposed in the cathode at the surface which faces the liquid electrolyte. The second layer is electrocatalytic carbon substrate 32 which is composed of about equal parts of carbon and a particulate hydrophobic polymer such as polytetrafluoroethylene (hereinafter PTFE). The next layer in the cathode is a metallic current collector 34 and the final layer which faces the third chamber 20 is an optional hydrophobic layer which may be used to prevent the electrolyte from leaking into the third chamber 18.

Figure 3:
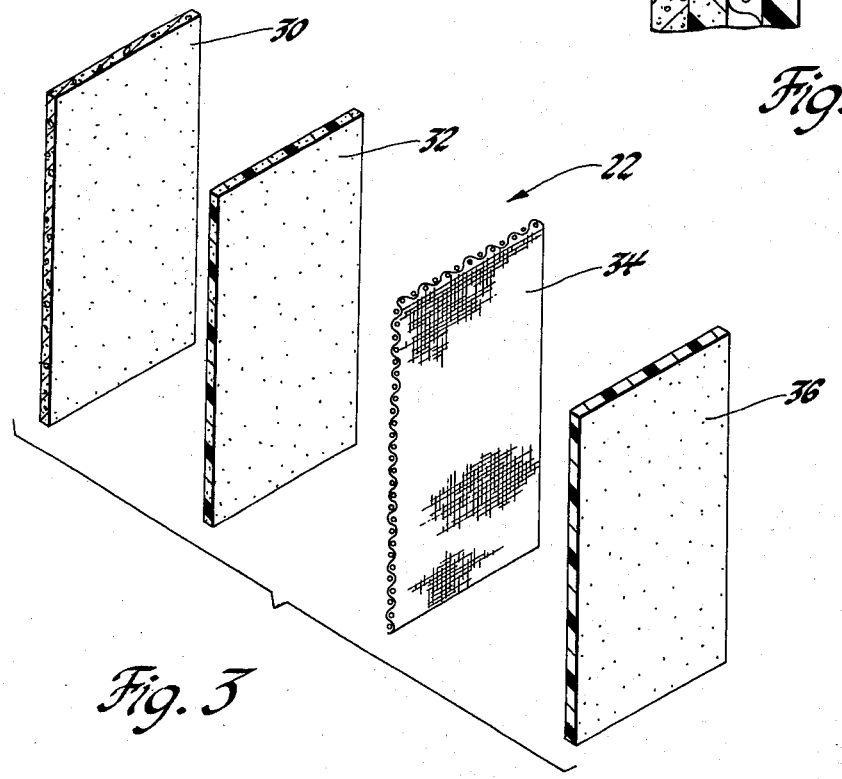

FIG. 3 is an expanded view of the air cathode of FIG. 2 which shows all four layers.

Figure 4:
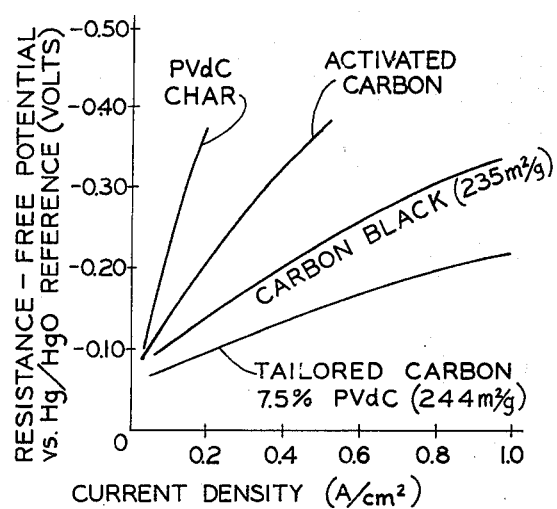

FIG. 4 is a graph showing the resistance-free potential in volts as a function of current density of various air cathodes differing in their carbon-based substrate. A more negative resistance-free potential indicates a less satisfactory cathode in terms of a shorter useful life and a lower produced voltage. More specifically, in this graph, the subject tailored-carbon substrate having about 7½ percent by weight PVdC char is compared to a pure carbon-black substrate, an activated carbon substrate and a PVdC char substrate.

Figure 5:
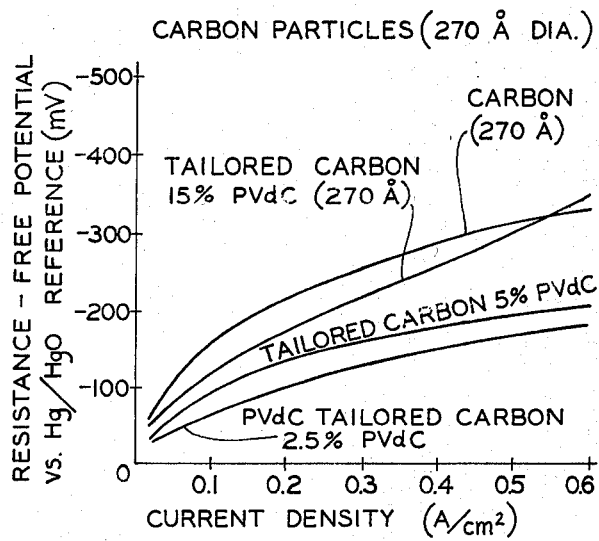

FIG. 5 is a graph which illustrates the resistance-free potential as a function of current density of various tailored carbon substrates differing in the amount of PVdC char in the substrate.

Figure 6:
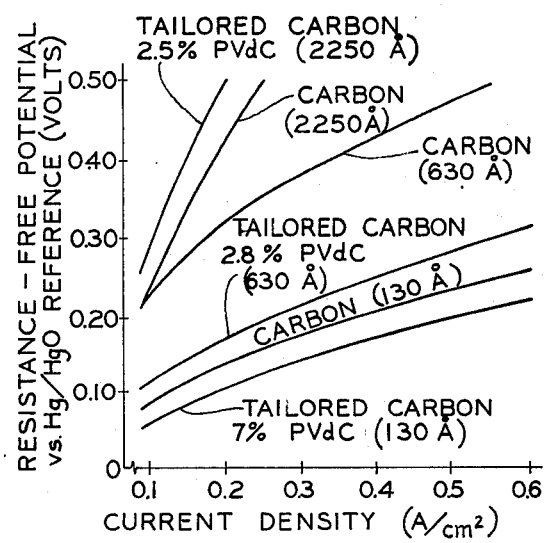

FIG. 6 is a graph showing the resistance-free potential as a function of current density for three pairs of cathodes. Each pair consists of a carbon black base substrate having a specific particle size and a tailored-carbon substrate made from a carbon black having the same particle size. From this graph, it is evident that the carbon black having the smaller particle size produces the most satisfactory tailored carbon electrode substrate.

Figure 7:
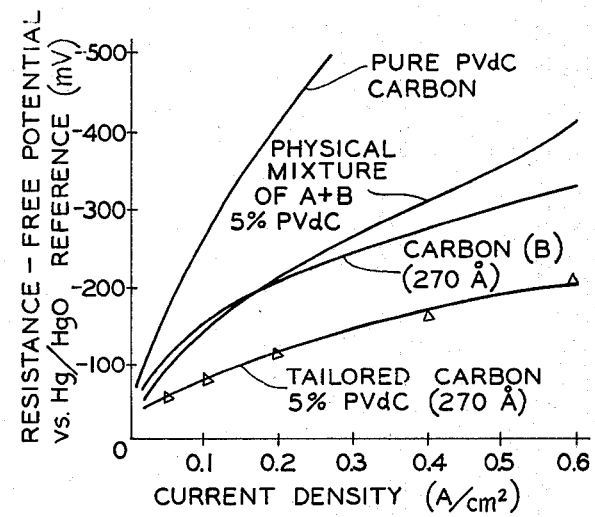

FIG. 7 is a graph of the resistance-free potential as a function of current density of air cathodes prepared from a pure carbon black base, a pure PVdC char base, a tailored carbon prepared in accordance with the subject processes and, a physical mixture of carbon black particles and PVdC char particles. From this, it is evident that simply mixing the two ingredients will not produce the desired synergistic effect which is obtained if the carbon and polymer are blended prior to the pyrolisis of the PVdC.

Figure 8:
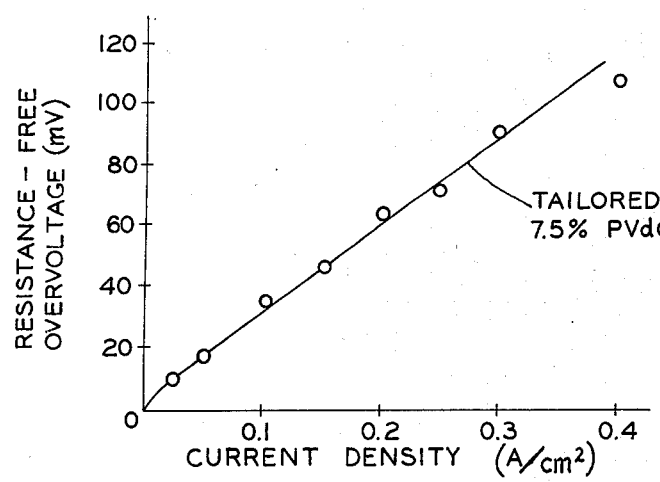

FIG. 8 is a plot of the overvoltage as a function of current density for a hydrogen anode having an electrocatalytic tailored carbon substrate. The overvoltage is the potential loss due to electrode polarization and is determined by subtracting the operating voltage from the open circuit potential. This figure demonstrates that the subject tailored carbon substrate is useful in anode applications.

In accordance with the practice of this invention, an improved polarization resistant electrode is produced by using a substrate formed from the subject tailored-carbon composition. The tailored-carbon material produced herein is essentially an intimately mixed and then baked two component particulate material. One component is porous carbon particles having an average particle diameter of from 0.07 microns to about 130 A and a pore diameter of from 30 A to 300 A, and the other is a porous PVdC char having a pore diameter of from 10 A to 25 A, which char is believed to be coated or deposited onto the surface of the carbon particle. However, the exact physical relationship between the carbon particle and the PVdC char is unknown at this time. On the other hand, it is apparent that the synergistic effect of combining these two materials is in some way dependent upon this physical relationship. This is indirectly indicated by the failure of a simple mixture of carbon black particles and poly(vinylidene chloride) char particles to produce the desired synergistic effect. (See FIG. 7).

The subject method of treating carbon in the preparation of fuel cell electrodes has proved successful with a variety of particulate carbon materials having a particle diameter ranging from a maximum of about 0.07 microns to a minimum particle diameter of about 130 A. The preferred range of particle diameters is less than 300 A and a surface area of from 80 to 400 square meters per gram, with the most effective substrate produced from a carbon black having a particle diameter of less than 200 A. The pore size is measured by gas adsorption techniques as described in "Advances in Catalysis", Vol. IX, p. 143, by R. W. Cranston and F. A. Inkley, Academic Press, New York (1957).

Carbon particles having a diameter within the suitable range are typically porous materials having some internal porosity and a highly irregular surface and to be an effective substrate in an electrode used at the interface between a liquid electrolyte and a gaseous fuel or oxidant, it is necessary that a major portion of the pores have a pore diameter within the range of suitably from 30 A to 300 A and preferably from about 40 A to about 200 A; pores of the preferred size may also be the interstices between particles. This appears to be the optimum range for the electrochemical reactions which take place on this type of electrode which is often termed a gas depolarized electrode. The carbon may have some pores outside the preferred range, but if a significant portion of the pores fall outside this range the efficiency will be reduced accordingly.

In contrast to the suitable range of pore diameters in the carbon particles, the optimum pore diameter for the polymer char suitable for use in the subject process is within the range of from about 5 to 30 A and therefore it is believed that this component of the tailored-carbon substrate does not actively participate in the electrochemical reactions. At this time, the only polymer which, upon pyrolysis, produces a char having an adequate pore volume and a pore diameter within this desirable range is poly(vinylidene chloride). A copolymer may be used in this application providing it contains at least 80 to 85 percent by weight of the vinylidene chloride monomer; other vinyl monomers such as acrylonitrile may constitute up to 15 to 20 percent by weight of the copolymer to promote its solubility. If the concentration of the monomer, other than (vinylidene chloride) exceeds this range, the effectiveness of the polymer char will be decreased gradually. Other polymers which produce a porous char having a major portion of its pores within the suitable size range would also work in this application and should be considered equivalent to the poly(vinylidene chloride) char.

The particulate carbon and the polymer are intimately mixed by slowly adding a solution of the polymer to the carbon particles as it is being continuously stirred. Typically, this solution will contain about 10 grams of the polymer per 100 milliliters of the solutin which may be formed with any suitable solvent for poly(vinylidene chloride) such as tetrahydrofuran.

It is believed that during this mixing process the polymer is deposited onto the surface of the carbon black particles and it has been shown that either an emulsion or a solution may be used in this process.

Typically, as the solution, which includes emulsions as used herein, is added to the particulate carbon, the blend is continuously mixed (a commercial mixer with a planetary action is suitable) until a thick paste having a uniform consistency is reached. This doughy mixture is then dried, to remove the solvent, which may be reclaimed, and the frangible material is crushed to a granular consistency of from 10 to 20 mesh or finer. This mixing procedure is suitably done at room temperature and pressure.

The granulated carbon-polymer blend may then be dehydrochlorinated at a temperature about 400° C. in an optional intermediate step, or immediately baked at a temperature of from 700° C. to 1,400° C. If the optional step is used, the blend is placed in a closed crucible which is equipped to vent the hydrogen chloride that will be formed during a thermal decomposition of the PVdC. The blend is then heated for a period of several hours to a temperature above at least 400° C. This heating process thermally decomposes (i.e., pyrolyzes) the polymer leaving a carbonaceous char which is believed to be coated onto the surface of the carbon particles. The blend is then baked at a temperature of from 700° C. to 1,400° C. to remove any remaining HCl and to stabilize the particulate carbon.

As mentioned above, the particulate carbon-polymer mixture may be directly baked after blending by subjecting it to a temperature in the range of from about 700° to 1,400° C. for at least about 1 hour. This operation pyrolyzes the polymer and stabilizes the particulate carbon portion of the mixture rendering it less susceptible to oxidation and other degradation phenomena in the fuel cell environment; this high temperature baking process also promotes the optimum pore volume in the polymer char. For this purpose, it is preferred that the baking temperature be in the range of from 900° to 1,100° C. Care must be taken in this step to properly provide for the HCl if the intermediate step is omitted.

In general, the carbonaceous product of the subject method may be characterized as having a two nodal pore diameter distribution wherein a major portion of the pores have a diameter either in the range of from 10 to 20 A or in the range of from 40 to 200 A. However, this is not sufficient to characterize this material. This particular pore diameter distribution may be obtained by simply mixing sintered carbon particles having a pore size in the range of from 40 to 200 A and PVdC char particles having its characteristic pore size in the range of from 10 to 20 A. Tests have shown that this particular blend does not produce the aforementioned synergistic effect. (See FIG. 7).

Prior to forming the electrodes from the subject particulate carbon-PVdC char composition, it is necessary to add a suitable catalyst such as a mixture of silver acetate and palladium acetate to a concentration of about 15 percent by weight based on the carbon. Typically, this may be done by dissolving the catalytic compounds in ammonium hydroxide and water and then wetting the carbon sample with the catalyst solution. This wetting may be accomplished by placing the mixture in a circulating air oven at a temperature of about 100° C. and stirring the mixture as the catalyst solution is added dropwise until it is semi-dry. At this point, the sample is removed from the low temperature oven tightly covered with aluminum foil and transferred to an oven and heated therein for about 30 minutes to remove the solvent. This is a standard method of adding the metal catalyst and is not critical to the subject invention, and therefore the mixing parameters and concentrations may vary within that range which will provide an effective catalyzing component to a typical carbon particle substrate.

The subject electrodes are used in fuel cells (such as that shown in FIG. 1) having three chambers wherein the middle compartment 18 contains a liquid electrolyte 11 and the chambers 16 and 20 on each side contain the gas reactants. This type of fuel cell 10 will contain two electrodes; one, termed the hydrogen anode 24, will act as the reacting interface between the gaseous fuel, typically hydrogen 13, which is held in chamber 16 and the liquid electrolyte 11. The other electrode 22, termed the air cathode or oxygen cathode, will act as the reacting interface between the electrolyte 11 and the air or oxygen oxidant 15 held in chamber 20.

Typically, the air cathode 22 is a multi-layer laminate (as shown in FIG. 2) wherein the first layer 30 which faces the liquid electrolyte 11 is a hydrophilic layer such as a particulate potassium titanate and the next layer 32, moving away from the liquid electrolyte, is the electrocatalytic layer consisting of a uniform mixture of the tailored-carbon substrate, a wet proofing material such as a particulate hydrophobic polymer and the metal catalyst. The next layer 34 in the cathode 22 moving away from the liquid electrolyte 11 will be a metallic current collector 34 such as a nickel screen. Finally, the last layer 36 away from the liquid electrolyte and facing the chamber 20 will be a hydrophobic barrier layer to prevent the electrolyte 11 from seeping through to the air or oxygen 15. This barrier layer is often omitted if long term tests are not contemplated.

In forming the electrode several techniques have been used including a spraying technique, a dry ice process, and the vacuum table process which is used and described herein. The subject tailored-carbon composition is usable with all of these techniques.

In the vacuum table technique, the electrode is formed on the top surface of a porous support sheet which covers a vacuum chamber. Each layer is formed by pouring a suspension of its ingredients onto the support layer in the proper order as a vacuum is being drawn therethrough. Typically, the laminate structure is built with the bottom layer being the hydrophilic layer. Once the final layer has been formed, the electrode is pressed at a pressure of about 1,000 pounds per square inch and stripped from the support sheet. After pressing, the electrode is completely dried at a temperature of about 100° C. for five minutes and then sintered at a temperature in the range of from 260° to 420° C. for about five minutes. At this point the electrode may be repressed if desired.

In a suitable method of preparing the subject electrode, the carbon substrate was precatalyzed, that is, the silver-palladium catalysts were added before the electrode was formed. A post-catalyzing technique may also be used in accordance with this process wherein the solution of the silver and palladium acetate is brushed over the surface of the electrode after it has been pressed.

EXAMPLE I

In accordance with the practice of this invention, a copolymer containing about 85 percent by weight of PVdC and the balance being acrylonitrile was dissolved in tetrahydrofuran at a concentration of about 10 grams per 100 ml of solution. The specific copolymer often termed Saran used herein was that marketed by the Dow Chemical Company under the trade designation F-300. This particular copolymer has a carbon yield of about 28 percent by weight as compared to the yield of pure PVdC which is about 25 percent by weight. This solution was then added to 200 grams of carbon black particles having a surface area of 235 square meters per gram. This particular carbon black is marketed by the Cabot Corporation under the trade name Vulcan-XC72. The carbon black was continuously stirred by a planetary mixer as the solution was added in sufficient quantities to provide 7.5 percent, by weight, based upon the carbon content of the mixture, (on a solvent free basis) of carbon from the polymer. The resulting product was a relatively thick paste.

This paste was then spread in a thin layer on a tray and placed in a drying oven at a temperature of about 150° C. for a period of about 1½ hours. This step effectively removed almost all of the solvent. It is to be noted that care must be taken not to exceed this temperature as there may be a fire hazard if higher temperatures are used.

The dried carbon black-polymer mixture was then placed in an oven with an inert atmosphere such as nitrogen or Argon and heated to about 1,000° C. This heating process required about 1½ hours and the mixture was held at that temperature for an additional period of 2 hours. This baking operation serves several purposes: first, the polymer material is reduced to a porous char having an average pore diameter in the range of from 10 to 25 A; secondly, the carbon black material is stabilized during this process and rendered less susceptible to degradation reactions in the fuel cell; and finally, the carbon material will be rendered more electrically conductive to this step. It is to be noted that if the carbon material was heated to this temperature before blending with the copolymer, it will already be conductive.

The resulting tailored-carbon material which is an intimate mixture of a polymer char and carbon black is a very frangible particulate material which was then ground to about 200 mesh. The finely divided tailored-carbon was then catalyzed. In this step the tailored carbon was moistened with a solution of silver acetate and palladium acetate, at an atomic ratio of 15 atoms of silver per one atom of palladium in ammonium hydroxide and then dried for about 30 minutes at about 150° C. and baked for an additional 30 minutes at about 400° C. The concentration of the catalyst solution was about 65 milligrams of metals in the acetate mixture per milliliter, however, it may vary considerably. The solution was added to the tailored-carbon in proportions to provide about 15 percent by weight based on the carbon of the silver-palladium catalyst. This is a standard method of precatalyzing carbon black electrode substrates.

Air cathodes were then prepared from the precatalyzed tailored-carbon on a vacuum table having an active area of 135 square centimeters (11.6 × 11.6 centimeters) this vacuum table was connected to a Gast Model 1550 vacuum pump having a capacity of about 4½ cubic feet of free air per minute which provided a vacuum to the table in the range of from 22 to 26 inches of mercury. The support sheet which was the first layer on the vacuum table was non-printed newsprint paper. The first layer on top of the porous support sheet was the hydrophilic layer which was fibrous potassium titanate ($K_2TiO_3$) marketed by the DuPont Corporation. This material was deposited on the support sheet from a dispersion in pure isopropanol at a concentration of about 10 grams per liter; this suspension was prepared by mixing the ingredients in a high speed blender. After the material was well dispersed, ammonium hydroxide was slowly added to the mixture in the amount of about ½ ml per 100 ml of dispersion. This caused a partial coagulation of this suspension so that the resulting particles were too large to pass through the pores in the support sheet during the vacuum processing. With the vacuum pump running this suspension was poured onto the support sheet. The vacuum quickly removed the alcohol suspending medium leaving a relatively uniform layer of hydrophilic potassium titanate with a density of from about 1.5 to about 3 milligrams per square centimeter (hereinafter $mg/cm^2$).

The tailored-carbon was dispersed with an equal portion of PTFE in alcohol by blending ten grams of each with 400 ml of anhydrous isopropanol for five minutes at full speed in a Waring commercial blender, model 1120. The PTFE used in this experiment was the DuPont Company's T-30 which is composed of spherical particles having an average diameter of about ¼ of a micron.

A measured portion of the carbon-PTFE suspension sufficient to provide an area density within the suitable range of from about 5 $mg/cm^2$ to about 25 $mg/cm^2$, preferably about 15 $mg/cm^2$, was then diluted to about 200 ml with isopropanol and poured onto the vacuum table. The vacuum pump ran continuously during the deposition of the carbon-PTFE suspension. The vacuum again immediately pulled the suspending medium, alcohol, from the electrode leaving a layer of uniformly dispersed tailored-carbon particles and teflon particles.

The two layers were then placed in a press where the current collector was pressed into the tailored-carbon hydrophilic layer composite at a pressure of about 1,000 pounds per square inch and at a temperature of about 400° C. for about 7 minutes forming the electrode; the support sheet was then removed. The electrode was then evaluated in a conventional test cell. It is to be noted that a hydrophobic barrier layer which is conventionally added to the back of the current carrier was not used in the evaluation of the tailored-carbon substrate. This was done to eliminate another variable in the testing and to gain a better indication of the performance of the tailored-carbon substrate.

The finished electrodes which were about ¼ of a millimeter thick were evaluated against a nickel counter electrode using an alkaline electrolyte containing 33 percent potassium hydroxide (KOH) in water with a mercury/mercury oxide reference electrode. Potential measurements were made using a 60 cycle interrupter to eliminate resistance effects in the electrode and electrolyte. Due to the effects of air diffusion on the potential at the maximum current density tested (1 amp per square centimeter), the air flow was adjusted to a slight excess over that necessary to give a minimum polarization at the maximum current density. The electrolyte was heated to a temperature of 50° C. for this evaluation. This half-cell technique is described in "Fuel Cells" by L. G. Austin, NASA SP-120, Washington, D.C. (1967).

The first step in testing an electrode was to apply a current density of about 200 mA/cm$^2$ until the electrode stabilized at a minimum polarization for about 5 to 10 minutes. The next step was to apply a current density of about 500 mA/cm$^2$ until the electrode stabilized at a minimum polarization for about 5 to 10 minutes. At this point, if the electrode had stabilized at these two values, the actual potential versus current density curve was run by dropping the applied current density to about 12½ mA/cm$^2$, holding it at that level for 5 to 10 seconds, and recording the potential. The current density was then increased to 25 mA/cm$^2$ for 5 to 10 seconds and the polarization was again recorded. These steps were repeated as the current density was incrementally increased to about 1,000 mA/cm$^2$. At this level, the electrode was again allowed to stabilize for about 5 minutes at a minimum polarization. Then, the curve was remeasured by dropping the current density to 800 mA/cm$^2$, 600 mA/cm$^2$, 400 mA/cm$^2$, and so forth on down the scale and held at each value for about 5 to 10 seconds to measure the potential.

The electrode formed in this example showed an over-voltage or a potential of about −0.2 of a volt when compared to the reference electrode at a current density of 1 amp per square centimeter. This is considerably less than the potential of electrodes prepared from the poly(vinylidene chloride) char alone or the base carbon black alone, as shown in FIG. 4. Also plotted in this curve are the polarizations of electrodes prepared from activated carbon which is a porous carbon material having a great proportion of its pores of a diameter less than about 25 A.

EXAMPLE II

This example is included to illustrate that the subject tailored-carbon substrate may be used in the anode as well as in the cathode. In preparing the tailored-carbon for this example, the procedures described in Example I were used. More specifically, the carbon black used in this example was Vulcan XC-72 which had a surface area of about 235 square meters per gram and a particle size of about 300 A. The copolymer used in this examle contained about 85 percent by weight of poly(-vinylidene chloride) with the balance being acrylonitrile. As mentioned before, the acrylonitrile serves to increase the solubility of the copolymer in a solvent such as tetrahydrofuran. In the preparation of this particular anode, the copolymer and the carbon black were mixed in proportions so as to provide the final mixture with 7 percent by weight of carbon from the polymer char. The resulting mixture was pyrolyzed and precatalyzed in accordance with the procedures described in Example I with the exception that the catalyst materials were rhodium and palladium in a 90–10 weight ratio and were deposited from solutions of the metal chlorides. The carbon substrate material was then prepared from this blend by mixing it with about equal proportions of a PTFE.

A thin layer (i.e., about 0.4 mm) of the precatalyzed carbon substrate was then formed on the vacuum table in accordance with the procedures described in Example I. This layer was then pressed against a nickel plated copper screen at a pressure of about 5½ × 10$^8$ pascales (hereinafter Pa). This two layer composite was then compressed against a thin film of PTFE particles of which about 80 percent were fibers having dimensions of about 5 × 35 microns with the balance being spherical particles having an average diameter of about ¼ micron. The final pressing operation was done at a pressure of about 5½ × 10$^7$ Pa under a temperature of about 425° C. for about 60 seconds. The layers were arranged in such a manner that the screen separated the tailored-carbon substrate and the PTFE barrier film. Then a layer of magnesium acetate was applied from solution to the tailored carbon face of the substrate. The magnesium acetate serves as the hydrophilic portion of the anode. It is to be noted that other hydrophilic and hydrophobic materials could be used in this application.

FIG. 8 is a graph of the overvoltage in millivolts as a function of current density in mA/cm$^2$. The overvoltage is calculated by subtracting the measured operating voltage from the open circuit voltage and indicates, as does the polarization, the reduction in voltage between the poles of the fuel cell due to the polarization of the anode.

EXAMPLE III

To more fully illustrate the scope of the subject invention and the possible basic mechanisms by which the tailored-carbon substrate is able to form a more polarization-resistant electrode, air cathodes were prepared and evaluated from the following materials:

1. a simple carbon-black material having an average particle size of about 630 A. It was necessary to bake this material to stabilize it and to make it more electrically conductive, 2. a carbon black material having an average particle size of 2,250 A; this carbon black was also baked, 3. a tailored-carbon formed from about 2½ percent by weight of PVdC char with the balance being carbon black having a particle size of about 2,250 A, 4. a tailored-carbon containing about 2½ percent by weight of the PVdC char and the balance being a carbon black having a particle size of 630 A, 5. a carbon black having an average particle size of about 130 A which was also baked, 6. a tailored-carbon containing about 7 percent by weight of PVdC char, the balance being a carbon black having a particle size of about 130 A.

This data is plotted in FIG. 6 and from it the following conclusions can be drawn. From this graph it is evident that the subject tailored-carbon substrate is most effective if the carbon particles have a diameter less than 200 A.

The group of curves plotted in FIG. 5 were generated to determine the optimum concentration of poly(vinylidene chloride) char in the tailored carbon composition. The cathodes prepared from the following compositions were evaluated:

1. a carbon-black composition having an average particle diameter of about 270 A and a surface area of about 80 square meters per gram, 2. a tailored-carbon composition containing 1¼ percent by weight of PVdC char and the bove carbon black, 3. a tailored-carbon composition containing 5 percent by weight of PVdC char and the above carbon black, 4. a tailored-carbon composition containing about 2½ percent by weight of a PVdC char and the above carbon black, 5. a tailored-carbon composition containing 15 percent by weight of a PVdC char and the above carbon black.

The data from this group of experiments is plotted in FIG. 5 and for this particular carbon-black composition it is evident that the optimum cathode substrate composition is formed when the PVdC char constitutes about 2½ percent by weight of the material.

These next group of experiments conducted in this example were designed to determine the importance of mixing the polymer and the carbon black to produce the desired synergistic effect. Therefore, the following compositions were formulated and evaluated in the air cathode application:

1. an air cathode was formed using pure PVdC char as the carbon substrate, 2. a carbon black having an average particle diameter in the range of about 270 A was used to form an air cathode, 3. a physical mixture of five percent by weight of PVdC char particles with the balance being the carbon black having particles having the diameter of 270 A.

4. a tailored-carbon was formed from the carbon black used above the PVdC char. This composition was formed in accordance with the procedures described in Example I.

The evaluation data from these cathodes are plotted in FIG. 7, and it is readily apparent that the carbon black and the PVcD char must be blended in a specific manner to form an intimately mixed blend. The solution mixing method described in this applicaton suggests that the polymer may in fact be deposited on the surface of the carbon black particles and remain on the surface after the pyrolysis and baking steps. Whether this process produces a uniform on nonuniform coating, is not known at the present time. In fact, at this time, it is not known if it is a coating step or simply a method which ensures an intimate contact between the carbon black particles and the subsequently produced poly(vinylidene chloride) char.

While our invention has been described in terms of certain specific embodiments, it will be appreciated that other forms thereof could readily be adapted by one skilled in the art. Therefore, the scope of our invention is not to be limited to the specific embodiments disclosed.

What is claimed is:

1. A method of preparing a carbonaceous material suitable for use in the electrocatalytic substrate of fuel cell electrodes comprising the steps of:

a. depositing from solution onto carbon particles having an average particle diameter in the range of from about 0.07 microns to about 130 A and pores with a diameter in the range of from 30 A to 300 A a copolymer consisting essentially of at least 85 percent by weight of vinylidene chloride and the balance being a compatible vinyl monomer or mixtures thereof, the amount of said copolymer deposited being such that its carbon content contributes from about 1 to about 15 percent by weight of the total carbon content of the carbon particle-copolymer mixture;

b. then heating the mixture to a temperature in the range of from 700° C. to 1,400° C. to pyrolyze the polymer and generate a porous carbon char therefrom.

2. In a fuel cell operable at ambient temperature and employing a liquid electrolyte and a gaseous reactant, an electrode comprising a tailored-carbon substrate formed from a pretreated electrocatalytic carbon based composition, the composition prepared by depositing from solution onto carbon particles having an average diameter in the range of from about 0.07 microns to about 130 A and having pores with a diameter in the range of from 30 A to 300 A, a copolymer consisting of at least 85 percent by weight of vinylidene chloride with the balance being a compatible vinyl monomer and/or mixtures thereof, the amount of the copolymer being sufficient to provide the copolymer-carbon mixture with from about 1 to about 15 percent, by weight based on the carbon content of the mixture of copolymer carbon, heating the copolymer-carbon mixture to a temperature in the range of from 700° C. to 1,400° C. to dehydrochlorinate the polymer and generate a porous char therefrom.

3. A method of preparing a carbonaceous material suitable for use in fuel cell electrodes, operable at ambient temperature and employing a liquid alkaline electrolyte and gaseous fuels and oxidants, the method comprising the steps of:

a. dissolving an organic copolymer consisting essentially of at least about 85 percent by weight of vinylidene chloride with the balance being a compatible monomer or mixture of monomers in an organic solvent at a concentration of from about 5 to about 15 grams of copolymer per 100 milliliters of solution, b. thoroughly mixing the solution with a porous carbon particulate material having a particle diameter in the range of from 0.07 microns to 130 A and with a major portion of the pores having a diameter in the range of from 40 to 200 A, in such proportions to provide said mixture with from about 1 to 15 percent by weight of the total carbon content of the mixture on a solvent free basis of copolymer carbon;

c. removing the solvent from said mixture; and d. heating the mixture to a temperature of from about 700° C. to 1,400° C. to pyrolyze the polymer and generate a porous char therefrom.

4. A gas depolarized cathode suitable for use in a fuel cell which is operable to ambient temperature and which employs a liquid electrolyte and a gaseous reactant comprising:
- a current collector;
- a layer of electrocatalytic carbonaceous material; and
- a layer of hydrophilic particles;
- wherein said electrocatalytic material comprises a tailored carbon formed by:
  a. depositing onto a porous and particulate carbon substance having a particle diameter in the range of from about 0.07 microns to about 130 A and a major portion of the pores having a diameter in the range of from 40 to 200 A, a copolymer comprising at least about 85 percent by weight poly(vinylidene chloride) by thoroughly mixing the carbon particles with a solution containing from about 5 to about 15 grams of the poly(vinylidene chloride) per milliliters of solution in such proportions to provide the mixture with from about 1 to about 15 percent by weight of copolymer carbon based on the total carbon content of the mixture on a solvent free basis;
  b. removing the solvent;
  c. heating the coated carbon black particles to a temperature of from about 700° C. to about 1,400° C. to pyrolyze the copolymer and generate a porous char therefrom.

* * * * *